US006366919B2

(12) United States Patent
O'Kane, Jr. et al.

(10) Patent No.: US 6,366,919 B2
(45) Date of Patent: Apr. 2, 2002

(54) SYSTEM FOR MANAGING TELECOMMUNICATION SITES

(75) Inventors: Hugh O'Kane, Jr., Locust Valley; Frank L. Stanton, Hicksville, both of NY (US)

(73) Assignee: Lexent Inc., New York, NY (US)

( * ) Notice: Subject to any disclaimer, the term of this patent is extended or adjusted under 35 U.S.C. 154(b) by 0 days.

(21) Appl. No.: 09/867,900

(22) Filed: May 30, 2001

Related U.S. Application Data

(63) Continuation of application No. 09/414,765, filed on Oct. 7, 1999.
(60) Provisional application No. 60/125,761, filed on Mar. 23, 1999.

(51) Int. Cl.[7] ............................................. G06F 17/30
(52) U.S. Cl. .............................. 707/101; 707/2; 707/10; 707/200; 709/223; 709/100; 379/9.03; 379/201.05; 379/112
(58) Field of Search .............................. 707/2, 5, 6, 9, 707/10, 101, 200–201; 705/5, 26–28, 412; 703/21; 709/223–226; 379/9.03, 15.03, 201.05, 221.03

(56) References Cited

U.S. PATENT DOCUMENTS

| | | | |
|---|---|---|---|
| 5,819,255 A | * 10/1998 | Celis et al. ..................... 707/2 |
| 5,822,747 A | * 10/1998 | Graefe et al. ................... 707/2 |
| 5,881,131 A | 3/1999 | Farris et al. ............. 379/15.03 |
| 5,883,948 A | 3/1999 | Dunn ..................... 379/221.09 |
| 5,890,134 A | * 3/1999 | Fox ................................. 705/9 |
| 5,905,951 A | 5/1999 | Orosz ......................... 455/423 |
| 5,930,779 A | 7/1999 | Knoblock et al. .......... 705/412 |
| 5,991,728 A | 11/1999 | DeBusk et al. ................ 705/2 |
| 5,991,759 A | 11/1999 | Knoblock et al. ............ 707/10 |
| 6,023,699 A | 2/2000 | Knoblock et al. ............ 707/10 |
| 6,028,602 A | 2/2000 | Weidenfeller et al. ....... 345/781 |
| 6,065,123 A | * 5/2000 | Chou et al. .................. 713/322 |
| 6,067,030 A | 5/2000 | Burnett et al. .......... 340/870.05 |
| 6,128,588 A | * 10/2000 | Chacon .......................... 703/6 |
| 6,205,441 B1 | * 3/2001 | Al-omari et al. ............... 707/2 |
| 6,240,439 B1 | * 5/2001 | Hasegawa et al. .......... 709/100 |
| 6,249,571 B1 | * 6/2001 | Rojas .......................... 379/112 |

OTHER PUBLICATIONS

Corn, Phyllis A. et al., "An Autonomous Distributed Expert System for Switched Network Maintenance", IEEE Global Telecommunications Conference, 1988, and Exhibition. 'Communication for the Information Age.' Nov. 28–Dec. 1, 1988, pp. 1530–1537, vol. 3.

John, T.C. et al., "Integrated Maintenance for Communication Networks—An AT & T Solutions", IEEE Global Telecommunications Conference, 'Countdown to the New Millennium' Dec. 2–5, 1991, pp. 654–657, vol.: 1.

* cited by examiner

Primary Examiner—Hosain T. Alam
Assistant Examiner—Shahid Alam
(74) Attorney, Agent, or Firm—St. Onge Steward Johnston & Reens LLC

(57) ABSTRACT

A system for maintaining, updating repairing and monitoring remotely located communication equipment sites is described with which the sites can be managed and maintained. Data relative to each site is stored and alterations proposed for the site are automatically monitored and verified prior to implementation. Clients who own and use the sites can confirm the status of the communication equipment through a web site where the client can have access to the data while preserving the proprietary nature of the data as it relates to the client. The status of various equipment is maintained to promptly inform an owner of the site, through access of the web site, of the feasibility of a proposed change in interconnections, or power use or availability of a particular device.

56 Claims, 12 Drawing Sheets

MAINTENANCE SYSTEM OVERVIEW

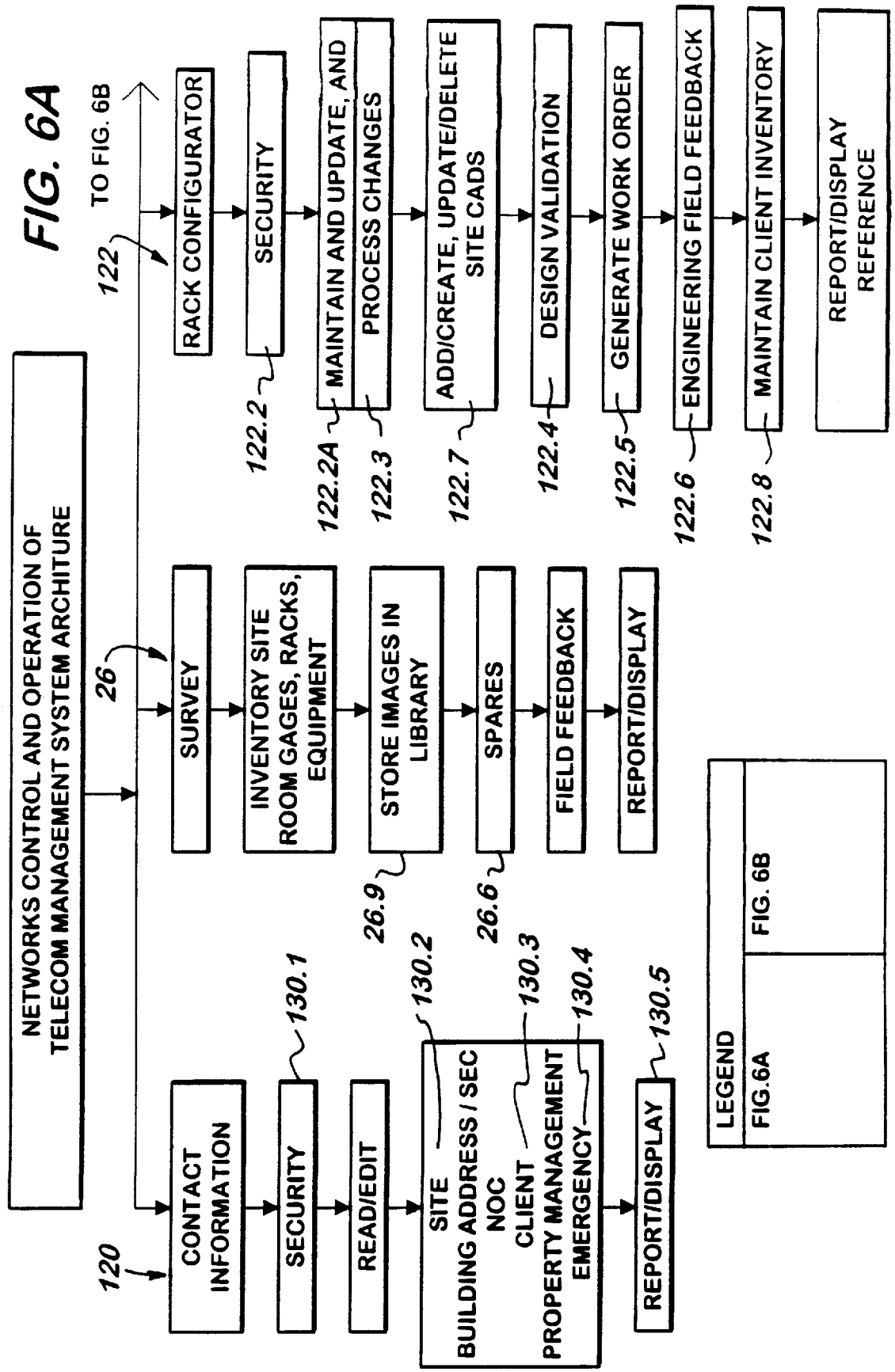

FIG. 13

Missjfdnsis aksjdissnmd jsudhwjsjnsdnsjk

File  Edit  View  Insert  Format  Help

RACK CONFIGURATION WIZARD

CURRENT RACK

| MODEL | DESCRIPTION | START U | POWER | SHELF | HEAT | PWR POS'N | 'A' BUS | 'B' BUS |
|---|---|---|---|---|---|---|---|---|
| EC9607 | FUJITSU: FAL FILTER | 76 | 8 | 8 | 25 | FAP-1206.14.9-POS1 | ☐ | ☐ |
| OC-18 | NORTEL: S/DMS TRANS... | 62 | 8 | 3 | 25 | BIP-1206.22.9-POS1 | ☐ | ☐ |
| DSX | DSX / ADC: COPPER CROSS | 48 | 8 | 2 | 25 | FAP-1206.14.9-POS2 | ☐ | ☐ |
| LGX | LGX / LUCENT: FIBER DIST... | 20 | 8 | 1 | 25 | FAP-1206.14.9-POS3 | ☐ | ☐ |

NEW RACK EQUIPMENT

SELECT THE TYPE OF EQUIPMENT TO INSTALL

| O BIP | O FAP | O NETWORK EQUIPMENT | O FILTER DIST. | O COPPER DIST. |
|---|---|---|---|---|
| CONTINUE | PIDKIFJNNFN | NUMDJDHF | PHSJIDU | <REMOVE EQUIPMENT>  <MOVE EQUIPMENT> |

CURRENT CADD. DOES NOT CONTAIN ANY MODIFICATIONS 1206.14

| | |
|---|---|
| BLANK | 88 / 86 |
| FUSE AND ALARM PANEL | 84 / 82 |
| LGX-3 | 80 / 78 / 76 |

SYSTEM FOR MANAGING TELECOMMUNICATION SITES

RELATED APPLICATIONS

This application is a continuation of copending U.S. patent application Ser. No. 09/414,765, filed Oct. 7, 1999, which claims the benefit of, under 35 U.S.C. §119(e), U.S. Provisional Patent Application No. 60/125,761 filed Mar. 23, 1999.

FIELD OF THE INVENTION

The invention relates to management and maintenance of telecommunication sites and in particular to automated systems for managing remotely located sites.

BACKGROUND OF THE INVENTION

Telecommunication companies often have a large number of remotely located equipment sites. These sites typically include racks of telecommunication equipment, main and backup power supplies, equipment cooling systems, and spare part inventory. In larger sites the racks may be arranged in rows forming aisles between them.

The telecommunication equipment sites are frequently numerous, remote from the main office and/or unmanned and undergo frequent changes. Accordingly, telecommunication companies often lose track and control over what equipment and connections are installed, in use, or available for use at any particular site. Even if they are knowledgeable about the installed equipment, they may not have ready access to the information needed to maintain, repair and/or reconfigure the equipment as needs change. In addition, they are often unaware of the rack, power and cooling capacities of the sites and so are not readily able to add additional equipment without jeopardizing operation of the entire site.

These problems are exacerbated by explosive growth in the telecommunication business and by an insufficiency of qualified technicians.

What is desired, therefore, is a system for managing telecommunication sites which enable remote maintenance and reconfiguration of existing equipment by skilled technicians, and remotely engineered installation of new equipment according to expert rules. Also desired is a system which tracks and updates the content, arrangement, configuration and capacity of equipment at remote sites after installation, reconfiguration and/or maintenance.

SUMMARY OF THE INVENTION

It is, accordingly, an object of the invention to provide a remote telecommunication site management system which generates a maintenance program for the site from information collected about the site configuration and equipment.

Another object of the invention is to provide a telecommunication site management system which automatically matches a site work request with a technician having appropriate skills.

A further object of the invention is to provide a telecommunication site management system of the above character, which forwards a work request completion report to the client.

Still another object of the invention is to provide a telecommunication site management system of the above character, which updates equipment data and configuration according to the completion of the work request.

Yet another object of the invention is to provide a telecommunication site management system of the above character in which a work request drawing is redlined for review and approval to reflect how the work was actually completed.

Still a further object of the invention is to provide a telecommunication site management system for an outsource vendor and in which a client may generate a work request together with a drawing of the site for use by a technician.

Yet still another object of the invention is to provide a telecommunication site management system of the above character in which a technician redlines a drawing of a remote site to show equipment "as built" for approval by the client.

These and other objects and advantages are achieved by one telecommunication site management system in accordance with the invention wherein a computer center is connected either directly or through an appropriate network such as the internet or a private network to various data bases. With the data stored in these data bases the installation, maintenance, updating of the remote telecommunication sites, and emergency servicing of the remote sites with competent personnel can be conveniently and accurately implemented.

These data bases include records of various types such as survey information related to the various telecommunication equipment installed at the remote sites, the particulars of the port connections of the equipment, the available power at the remote sites and environmental factors such as the available cooling capacity at the sites and the heat loads imposed on this by the installed equipment. In addition digital images of the installed racks and cages and other areas of the remote sites are stored. A data base of components representing various telecom equipment from different manufacturers is created in which form factors and performance characteristics are stored for use in creating designs of racks and cages in telecommunication rooms. Another data base includes the maintenance tasks and scheduling of these tasks for the various equipment at the different telecommunication sites. Another data base has records identifying the technicians and their particular expertise, qualifications and certifications for servicing particular telecom equipment.

Access to these data bases is controlled depending as to what work needs to be done. Implementation of service and installation originates through work orders that are communicated to the technicians as these are determined to be needed by the control center or by a client to whom the particular telecommunication site belongs. A client can access the various data bases through the network to determine or verify the actual installations by accessing digital images of a site and make remote designs and changes as appears necessary. Through these various activities on the equipment and system, the data bases, when needed, are updated and maintained current.

When a telecom equipment is installed an automatic verification of the necessary electrical power is made to confirm that there is sufficient electrical power available both at the site and at the particular rack where the equipment is to be installed. A similar verification as to the available cooling capacity can be made. After installation by a technician, an as built report is entered into the system and appropriate data bases updated to reflect the changes together with digital images of the equipment at the site that was serviced.

Hence, with a system and technique in accordance with the invention a client can maintain up to date knowledge of the equipment at its remote sites, while being able to rely upon the expertise and capabilities of another control center to maintain the telecommunication network in operation.

These and other objects and advantages of the invention can be appreciated from the following description of a preferred embodiment in accordance with the invention as described in the specification with reference to the drawings.

BRIEF DESCRIPTION OF THE DRAWINGS

FIGS. 6A and 6B are block diagram views of the architecture used in the telecommunication management system of this invention.

FIG. 13 is a plan view of a screen produced to configure a rack at a remote telecom site in accordance with the invention.

DETAILED DESCRIPTION OF THE DRAWINGS

Figure 1:
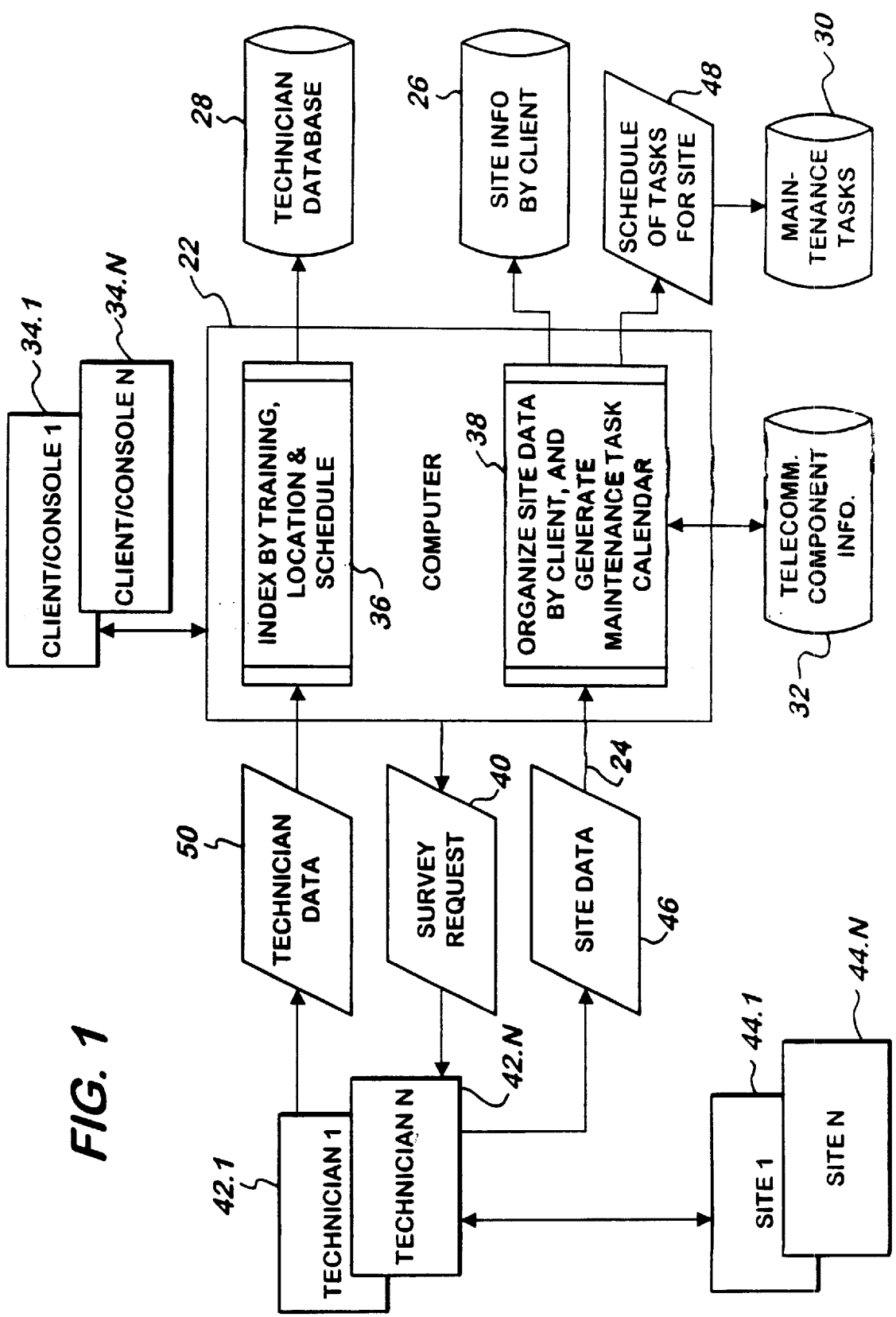
FIG. 1 is a block diagram depicting the client/site data collection process of a remote telecommunication site management system of the invention.

With reference to FIG. 1 a telecommunication management system 20 is shown using a conventional server-computer 22 connected to a network 24 such as the internet or another private network system. The modems or other communication devices inside the computer 22 are conventional and may be suitable for high speed communication as required by the system. The computer has a CPU which communicates with suitable data storage devices such as magnetic storage disks and appropriate portions thereof, all in manner as is well known in the art.

The telecommunication management system 20 in accordance with the invention contemplates organizing data in different data bases, which can be located at different sites and accessed through the network 24 or be a part of the computer 22. Thus there is, a site data base 26 in which information relevant to communication equipment at a particular site is stored, a technician data base 28, which relates to technicians and their respective specialties or training or certification with respect to particular equipment, a maintenance data base 30 in which data for maintenance tasks are stored and a telecommunication component data base 32. This latter data base 32 stores data such as telecom equipment power requirements, heating loads or power consumed, telecom ports, performance capabilities, form factors needed to mount the telecom equipment in racks and data relevant to the racks such as their-sizes, shapes and space availability.

The computer 22 is coupled to a control console 34, such as a keyboard coupled to the computer 22, and through which communications can be initiated as well as data entered into or steered into or extracted from the various data bases. The computer 22 can also be coupled to a server located at a client and with which bi-directional communication can be had via network 24 and similar functions provided as with the console 34. Hence, the drawings show the client/console as a common element 34.

The use of decimals after a numeral depicts the same type of item but indicates that a number of them are used. In this instance a number of different clients can have access to system 20 with each client being able to only access data related to their own sites. One way to obtain such client differentiation is by providing each with a different pass code, though a more secure approach can be a placement of different clients' data on different computers 22 and with the client having access only to their respective server.

Entry of data into the various data bases can be done through a variety of techniques such as through the network 24, from a client or from a technician located in the field or through the console 34 or through such other known data transferring techniques.

In the telecommunication management system 20 in accordance with the invention, data as to sites is organized at 36 by client, maintenance tasks and calendar schedule. Data related to technicians is organized at 38 by training, i.e. the technician's specialized skills on particular equipment if applicable, and their respective working schedules or availability as the case may be. Various organizing techniques can be employed.

System 20 commences operation with the generation of a survey request 40. This request can originate from the client or from a console. In this embodiment the survey request is passed through the computer 22 and relayed to a technician 42. The survey request imposes an acquisition of data by the technician as to a particular site 44 for insertion into the respective data bases. Either during or after the technician has visited the site 44 an electronic survey report 46 is prepared and forwarded via the network 24 to computer 36 where the data is distributed into the appropriate data bases 26, 28, 30 and if necessary 32. The electronic survey report from the technician can be transmitted directly from a portable computer located at the technician via network 24 to computer 22.

Another main feature of the invention involves maintenance tasks at the telecom sites. These tasks are predetermined and stored in data base 30 where they are accessed by the computer 22 through a schedule 48 for the tasks.

Certain equipment requires special skills for maintenance and repair and system 20 keeps track of those technicians having these skills through technician data base 28. Technician data 50 for the data base 28 is obtained from technicians or from a system administrator through a network link 24.

Figure 2:
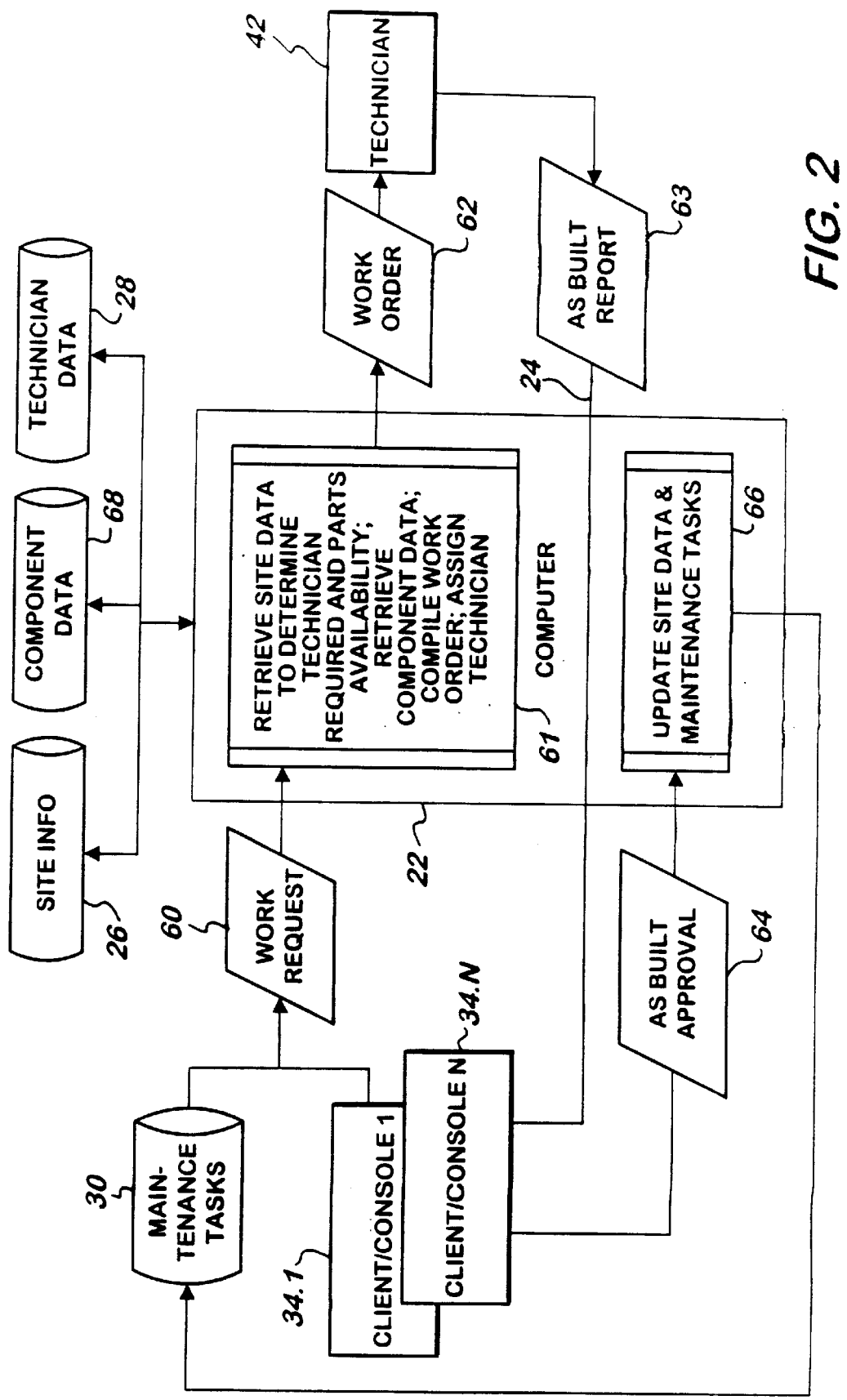
FIG. 2 is a block diagram depicting work request processing in a remote telecommunication site management system of the invention.

FIG. 2 illustrates a process and system to handle work requests required for a technician. Computer 22 may receive, either from a client or from the control console 34 or from an automatic schedule for maintenance tasks at 30, a work request 60 for a review of or change or update related to a remote telecom site. Authorization for generation of such work request is controlled through a priority authorization level organized inside computer 22 with suitable passwords. Once a work request is generated, the computer 22 responds with a retrieval of appropriate pertinent data relevant to the work request such as data relevant to the site from data base 26, particular skills required from the technician for complex telecom equipment located at the site, parts availability and their locations in case of a repair requirement.

Computer 22 compiles the data relevant to the work request at 61 into a work order 62 and assigns, if necessary, a particular technician having the required skills, for responding to the work request. Contact is made with the technician, either through an automatic dial up of the technician or through conventional communication paths. The technician's response to the work order 62 involves an electronic report 63 that is returned through the network 24 to computer 22 and the control console and/or client 34. This report typically includes a digital image of the telecom equipment at the remote and serviced site to enable the originator and others in control of the communication network to which the site relates to generate an approval report 64 representative of the evaluation and approval of the changes or installation made by the technician.

The computer 22 can then, upon receiving the approval 64 update at 66 the site data base 26 and any related data base such as a component data base 68 in which the spare parts data and performance data for particular telecom equipment may be stored.

Figure 3:
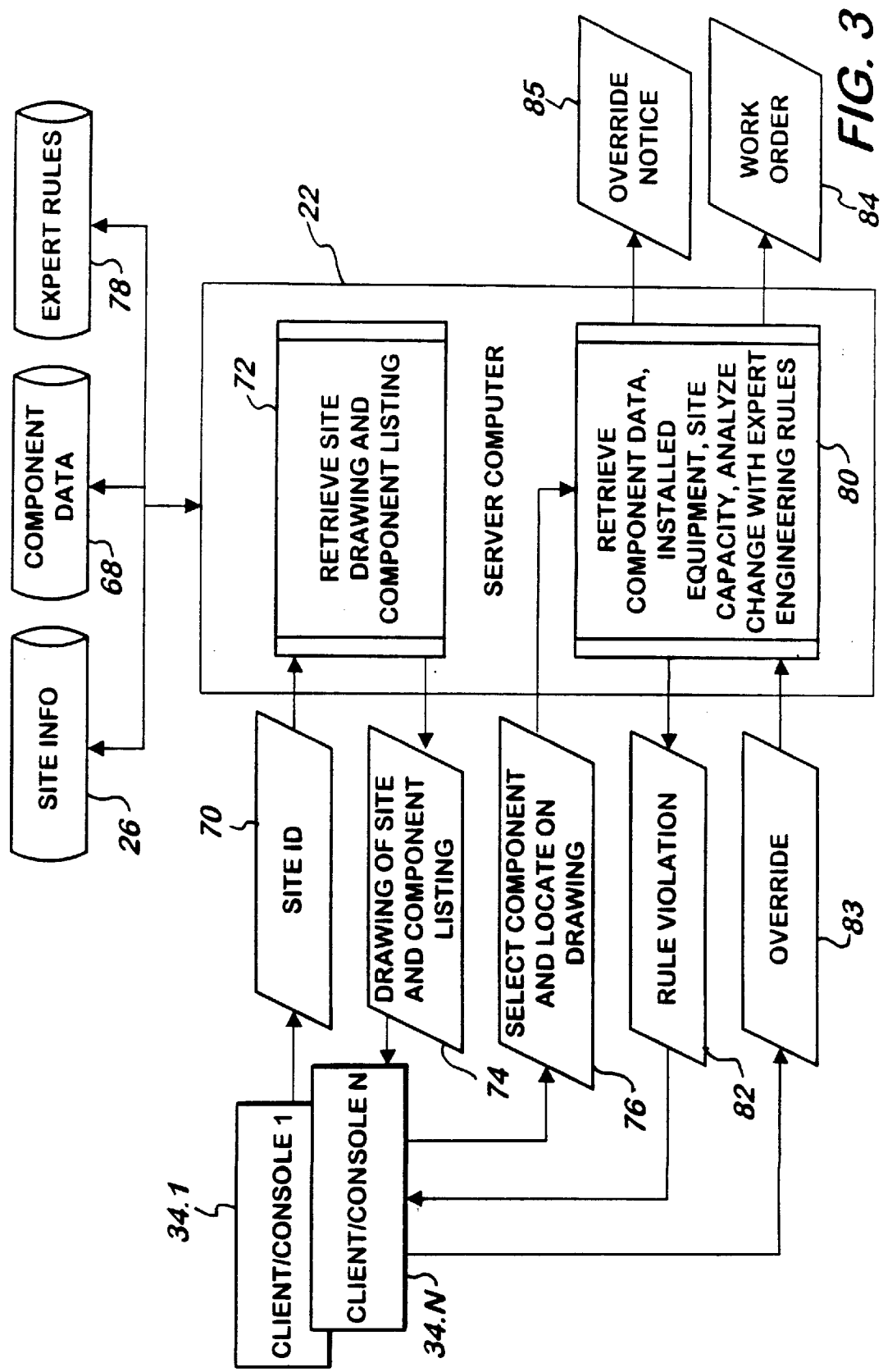
FIG. 3 is a block diagram depicting the work request creation and verification process in a remote telecommunication site management system of the invention.

Another aspect of the invention involves an ability to design, modify and develop a remote telecommunication site and from this work evolve a work request 60 that can be implemented by a technician. FIG. 3 illustrates one approach for such site development or change. A client or engineer at 34 working at a particular site as identified at 70 retrieves at 72 drawing data 74 relevant to the telecommunication site together with telecom component information from the appropriate data bases such as 26 and 68. The component data includes drawings of racks and a listing of the particular telecom components such as switches, optical fiber connectors, power supplies and distribution panels and the like.

Design of the telecom site involves clicking on a telecom component in the list and then dragging the component onto a particular area of the rack. This then results in the generation of a rack design that is forwarded at 76 to computer 22. Computer 22 then analyzes the design according to specific rules stored at 78. For example, one such rule requires that the total power demanded by all of the telecom components in anyone particular rack does not exceed a certain portion, such as 80%, of the power supply in the rack. Other rules relate to the incremental effect on the site's cooling requirements imposed by the new telecom equipment design, the data carrying capacity leading to the rack and the like.

In the event that computer 22 determines at 80 that the design introduces a violation of one of the predetermined rules, a warning to that effect is generated at 82 and sent to the console and client at 34. If the design passes the rules test, a work request 84 such as 60 in FIG. 1 is generated and a technician implements the requested design. In the event a rule violation has occurred, a decision from either a client or from the console generates at 83 an override signal to computer 22 and this in turn generates an appropriate override notice 85.

Figure 4:
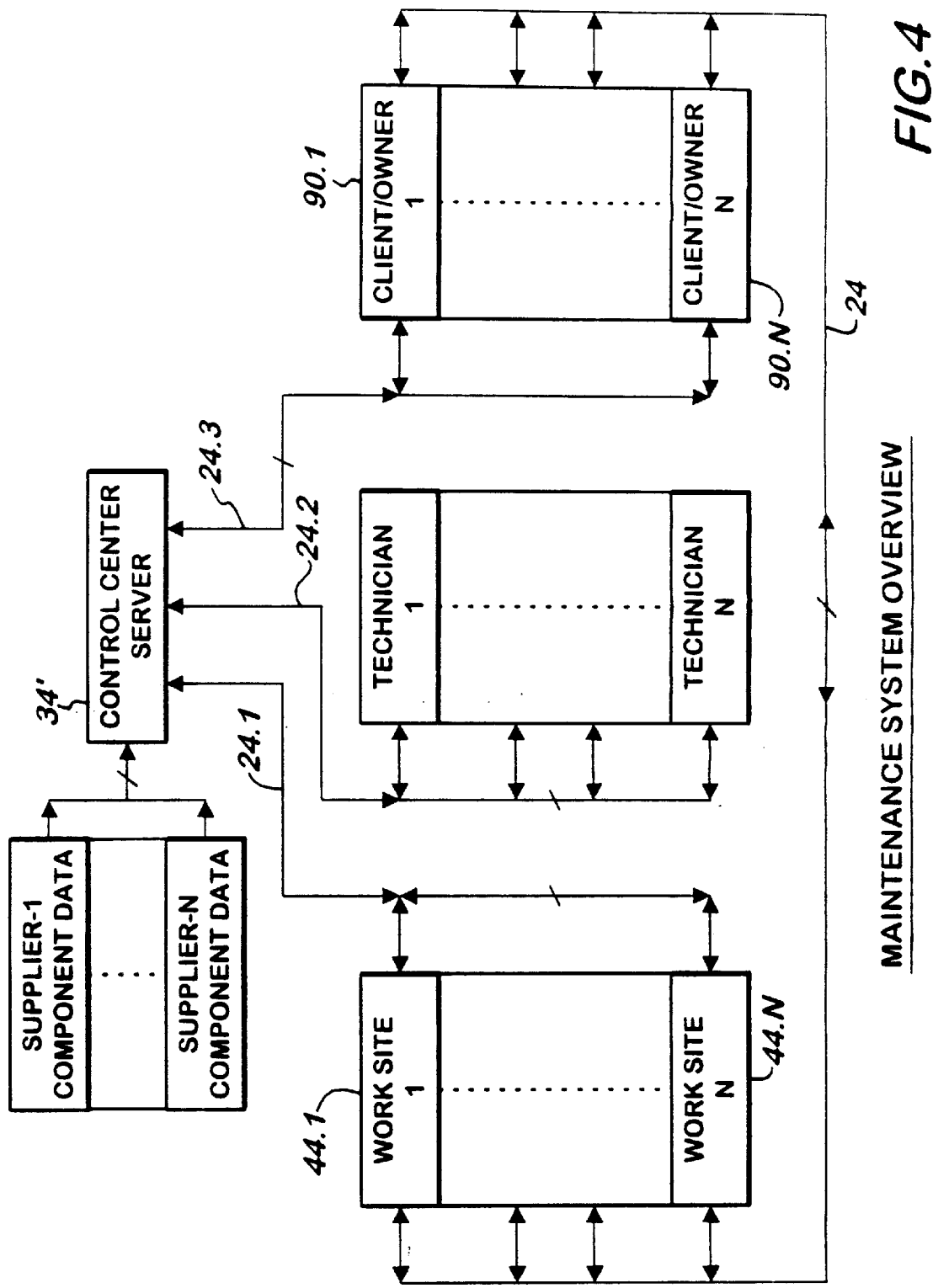
FIG. 4 is a block diagram view of one telecommunication system in accordance with the invention.

FIG. 4 illustrates an overall view of a telecommunication management system 20 in accordance with the invention. The system 20 in this case contemplates the management of a large number of different client telecom sites 44.1–44.n that are within the system's responsibility. A central control 34' communicates with each of the sites, and servers 90.1–90.n at different clients and with the respective technicians through network links 24. These network links can be a combination of private and/or general telephone company (telco) lines. The lines also enable the clients to communicate with individual work sites 44.

Figure 5:
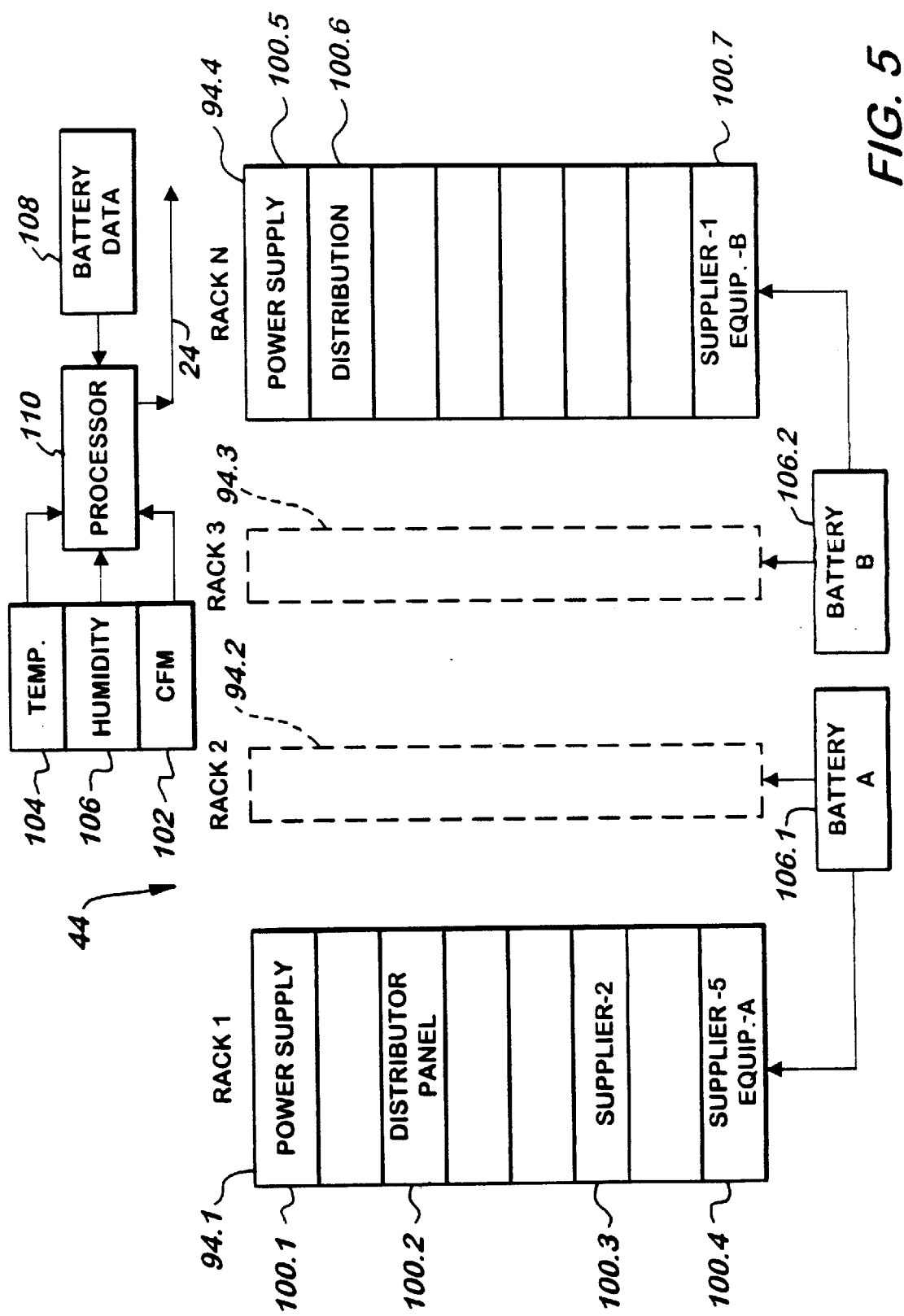
FIG. 5 is a schematic and block diagram view of one telecommunication site managed by the system of this invention.

FIG. 5 illustrates a typical telecommunication site 44 having a plurality of racks 94.1–94.4. Each rack 94 is subdivided into vertical units, commonly referred to as U's or with standard dimensions, and into which telecom equipment 100 can be installed such as a power supply 100.1, a power distribution panel 100.2 and individual telecom equipment 100.3 and 100.4.

The site 44 further has HVAC equipment with which certain environmental conditions such as heating, humidity and air cooling can be achieved. Typically the HVAC equipment for maintaining these environmental conditions is of limited scope and its ability to regulate the site 44 to desired temperature and humidity levels is affected by the amount of telecom equipment 100 that is installed in the various racks 94.

Accordingly, part of a technician's survey for the site 44 would include data relevant to the HVAC capabilities such as cooling capacity 102, characterized with the CFM capability of the HVAC equipment, since cooling can normally be expected to be required. The environmental data including site temperature 104 and site humidity 106 can be transmitted on a continual automatic basis to the central computer 22 or by the technician via network 24 through the site survey request and technique as described with reference to FIG. 1.

A key feature of the survey involves the rack battery capacity and an automatic determination at the central computer 22 to determine whether any one configuration of telecom equipment 100 in the racks 94 exceeds the maximum allowable power load on the power supplies and back up batteries 106. Accordingly DC power loads are carefully monitored and conditions, battery data 108, of the back-up batteries 106 are continually surveyed and reported to the central computer 22 by the technicians or automatically as suggested at 110 through the use of a microprocessor 112 coupled to the network 24. The illustrated site 44 in FIG. 5 is illustrative and many variations can be accommodated and are likely to occur under actual conditions.

Figure 6B:
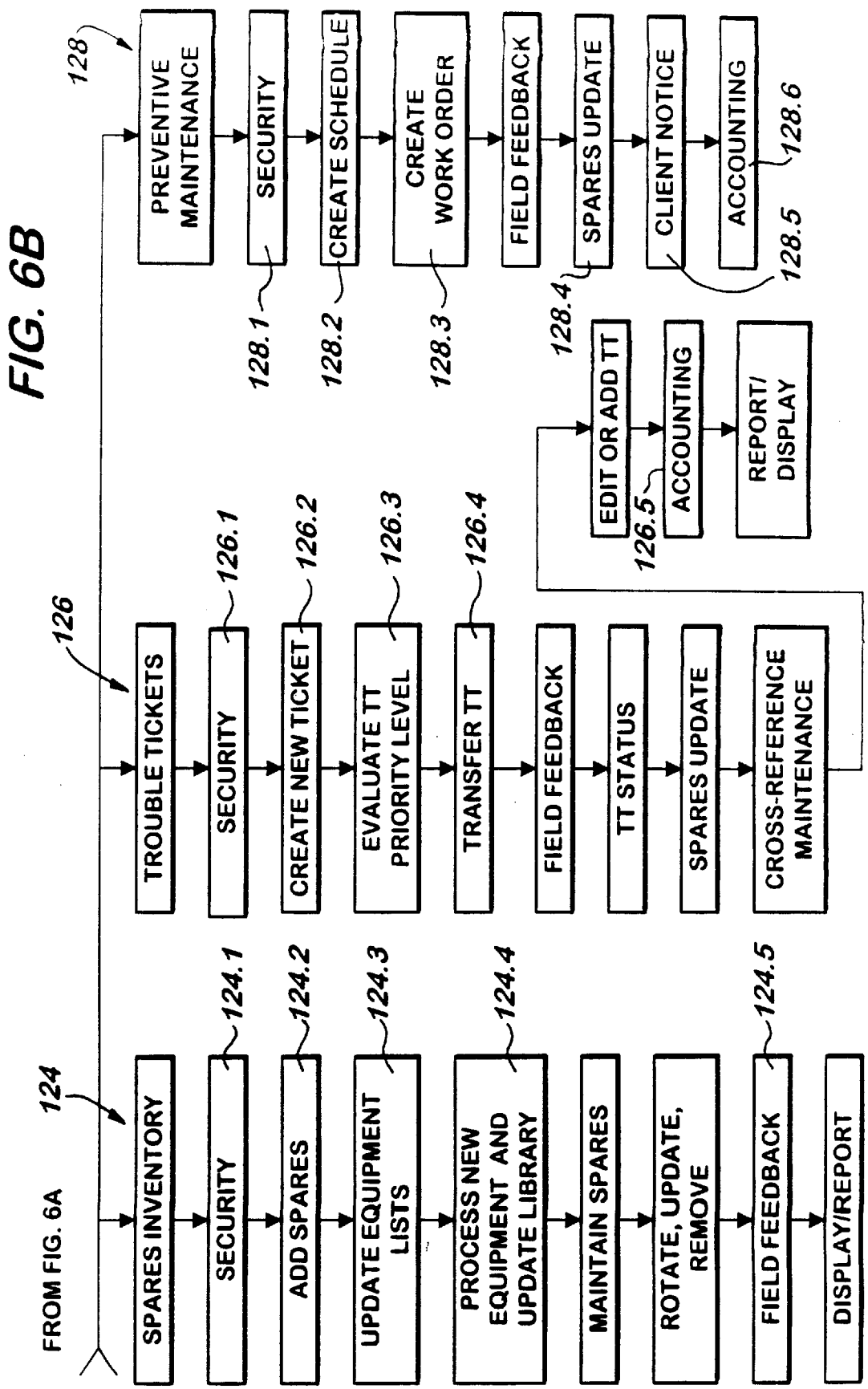

In FIGS. 6A and 6B an architecture for system 20 is illustrated. The system includes a contact information data base 120, the survey data base 26, a rack configurator 122, a spares controller 124, a trouble ticket processor 126 and preventive maintenance processor 128.

The contact information data base 120 accumulates information such as the authorized security level 130.1 for any one contact, the ability to edit and read details on the contact, the locations 130.2 of a particular and applicable site 44, the client 130.3 to whom the site belongs, emergency data 130.4 such as late hour access information for buildings that are normally closed after daylight working hours and an ability to generate appropriate reports 130.5 from the contact data base 120. The software for generating contact data is generally well known and need not be further described. Other functions of the contact data base are as shown in FIGS. 6A and 6B.

The survey data base accumulates data as to the inventory of telecom equipment 100 and racks 94 at anyone particular site 44. This data typically includes site identification, the particular room where the telecom equipment is located, the number of cages in which the telecom racks are located and the particular telecom equipment installed in the racks 94. Digital images of the telecom equipment and racks are stored in a library and available spares and field feedback data stored on a per site basis.

The rack configurator 122 includes an appropriate security validator 122.1 needed to limit authorization to particular persons to modify or create a design for a rack 94 with its telecom equipment 100, a process 122.2 for maintaining and updating a rack 94, a process 122.3 for making changes and including the addition or creation of site drawings such as CAD drawings of the racks 94 and equipment 100. A process 122.4 for validating a design in accordance with the applicable rules in data base 78, see FIG. 3, is provided to then produce at 122.5 a work request 84 as described with reference to FIG. 3. Field data from surveys are processed as feedback data at 122.6 and appropriate client inventory data produced for access by the client to which the applicable site 44 belongs. Reports can be generated from the various data in the rack configurator 122.

Spares inventory control 124 involves special access security at 124.1 and can then be used to order additional spare equipment 100 at 124.2. Once spares are used or added to, the list of spares and their respective locations are updated and stored at 124.3 for subsequent access by a technician responding to a work request. This facilitates the technician's response and his ability to determine where a suitable spare is located before personally proceeding to a site 44 needed to be serviced. New equipment and its form factor, i.e. size, shape, rack storage space requirements, power demanded and consumed and performance are entered into the data base 32 at 124.4. Various steps to maintain and update spare data from field surveys are achieved at 124.5 from data transmitted by the technicians from their portable communicators.

From time to time changes are needed or problems develop at a site 44 and system 20 provides a convenient technique for handling the technical work needed to get the work completed and provide an accounting statement to the client. The trouble ticket or work request process 126 involves a security validation step at 126.1 for the individual who is to issue the trouble ticket at 126.2 and at 126.3 applies a priority response level to the ticket processing. Hence, in case of an emergency the response to the trouble ticket is assured a prompt correction. The trouble ticket is transferred to the appropriate technician at 126.4 and after implementation of the work the system 20 issues an accounting report and/or invoice at 126.5.

Similarly preventive maintenance process 128 involves a security level screen at 128.1 a schedule generator 128.2 for the particular sites 44 and when so required a work order to perform preventive maintenance at 128.3. Appropriate field feedback with updating of spares inventory and client notification are done at steps 128.4 and 128.5. An accounting report with automatic bill generation occurs at 128.6.

Figure 7:
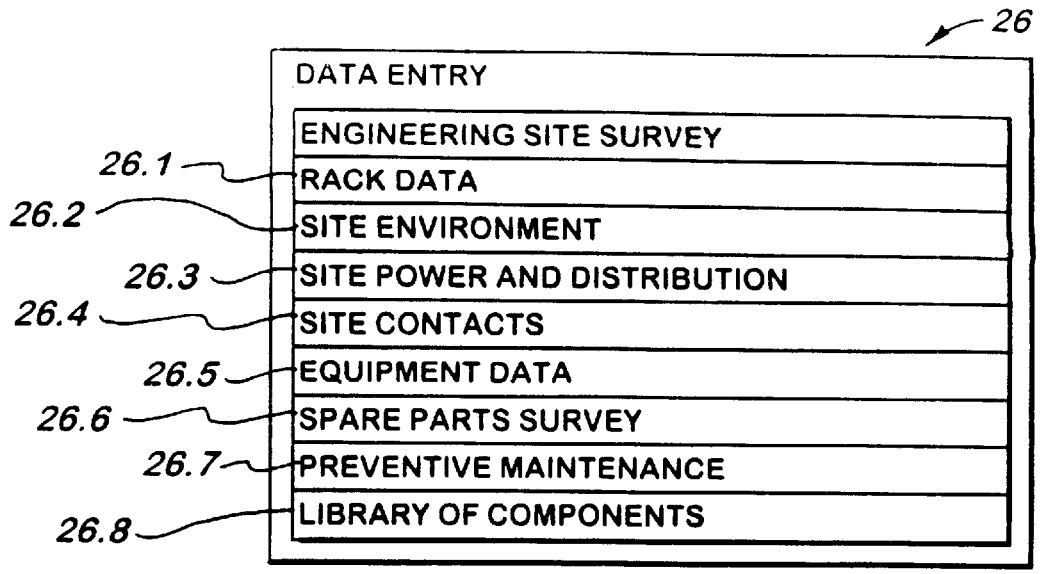
FIG. 7 is a block diagram view of data entry used in the system of FIGS. 6A and 6B.

FIG. 7 illustrates in greater detail the preliminary step 26 for system 20 in which data for various sites is assembled in the data bases of FIG. 1. Initially an engineering site survey is made and this includes an identification and determination what racks are present at the sites at 26.1. A determination as to what the environmental factors applicable to the site is made at 26.2, such as the available cooling power, which can be in CFM (cubic feet per minute of air cooled to a particular temperature), the humidity level that is maintained and the temperature.

The site power and power distribution is entered at 26.3 in the data base so that as additional racks are created the amount of power available for the equipment to be installed can be determined and monitored. Site contacts are determined at 26.4. This is important to enable the operator of system 20 to quickly determine and advise technicians how to enter the building at off hours, who to contact in case of emergencies and which technicians are particularly desired for handling work orders for the site. The contact list, therefore, includes information such as names, passwords, authorization sequences to enter a site, telephone and page numbers, in short all the information needed to properly access the site to be serviced.

Equipment data is assembled at 26.5. This includes an identification of equipment installed at the sites 26 as well as in which racks 94 (see FIG. 5) these are installed. All spares available at a site 26 are entered at 26.6 and a preventive maintenance schedule is stored at 26.7 in association with the site 26. A library of installed components, including images, and available spares can then be made at 26.8. One feature of the invention involves an ability to create and store for future comparison digital images of the racks 94 at the various sites. These images as shown in FIG. 6 are stored at 26.9 (see FIG. 6) in a data base in association with a particular site and date and can be accessed by a client through the network 24. Typically the images record equipment installed in a rack and enable the client as well as the operator of system 20, who may be wish to make changes to a rack to determine the feasibility of the change, both as to power and available communication ports.

Figure 8:
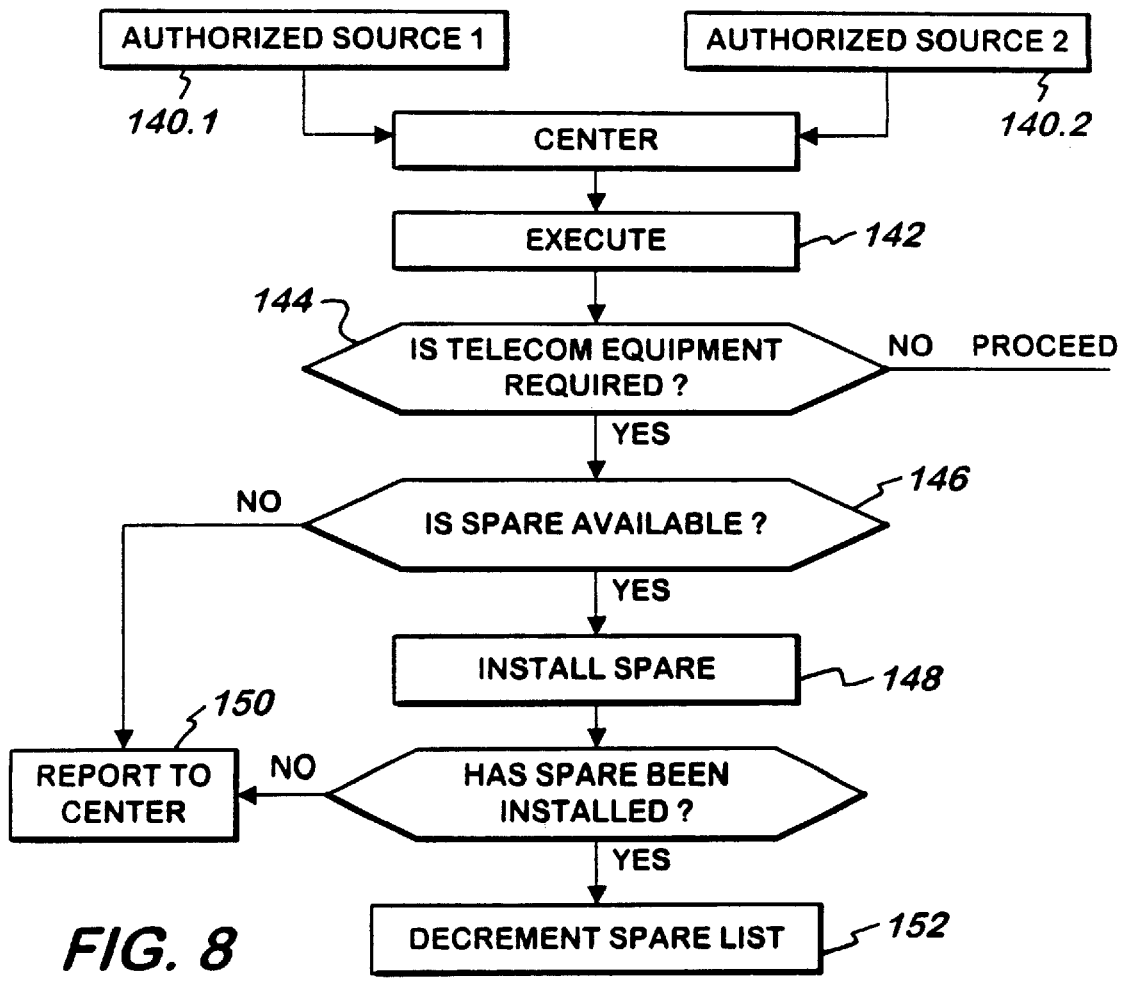
FIG. 8 is a flow diagram view of a trouble ticketing process used in the telecommunication system of the invention.

FIG. 8 illustrates in some greater detail one process of the invention to handle a work order also referred to as a trouble ticket process. The work order request 60 (see also FIG. 2) requires at least one of several authorized sources 140.1 and 140.2 such as operators of system 20 or a client. The trouble tickets are processed at the control center 34' (see FIG. 4), which proceeds to execute them at 142 in the manner as described with reference to FIG. 2 by sending a qualified technician to the site. Part of this process may involve a preliminary determination at 144 whether a particular telecom equipment needs to be replaced or added. If so, the availability of a spare is determined at 146 so that the technician can pick up the spare if it is not at the site for which the trouble ticket was issued. If a spare is available and it is installed by the technician at 148 an electronic field report 150 is issued to the control center 34' and the spare list generated at step 26.6, see FIG. 7 is updated at 152.

Figure 9:
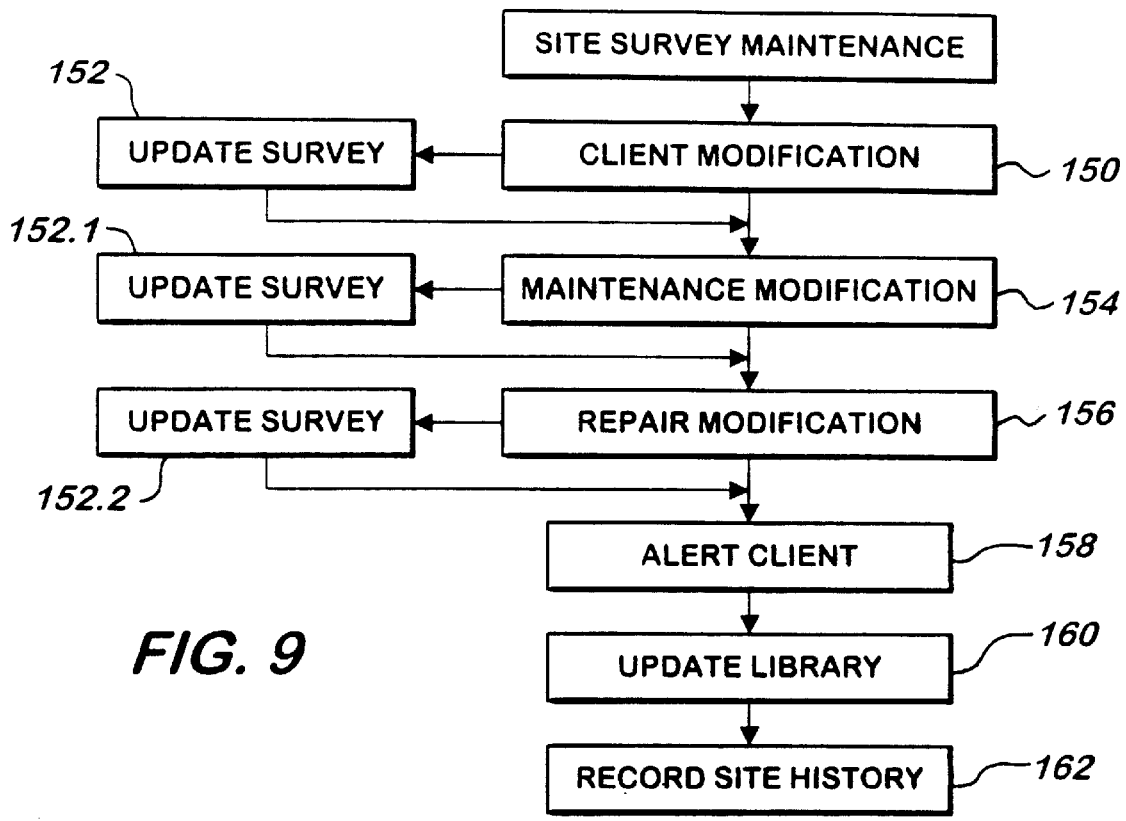
FIG. 9 is a flow diagram view of a site survey process used in the telecommunication system of the invention.
Figure 10:
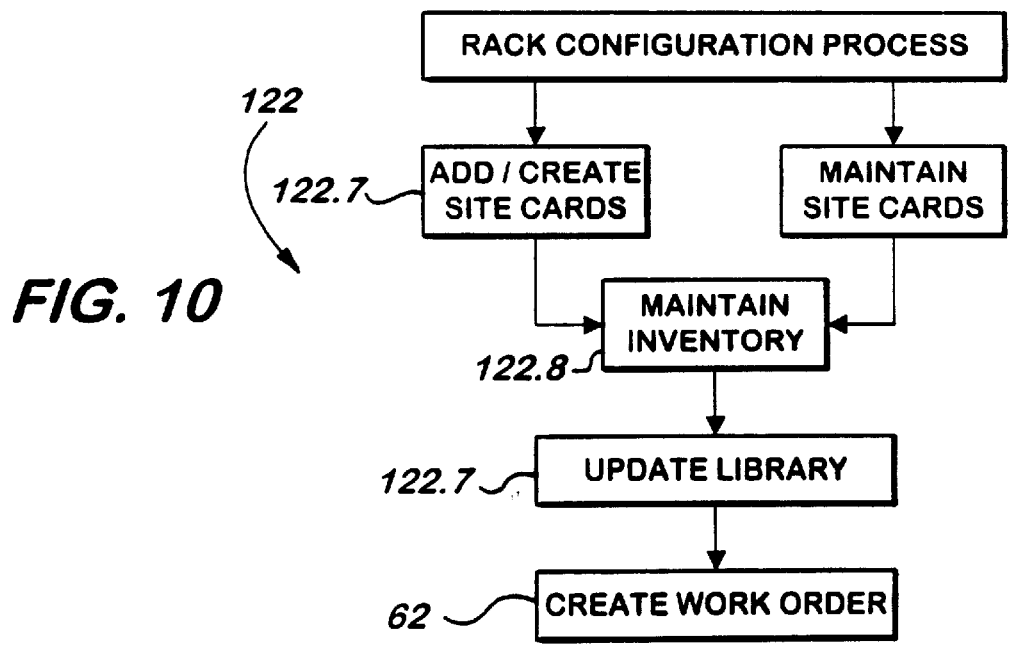
FIG. 10 is a flow diagram for configuring a rack in accordance with the telecommunication management system of the invention.

Maintaining the site surveys up to date as explained with reference to 66 in FIG. 2 involves, as shown in FIG. 9, responding to client introduced changes at 150 with an update at 152 of the site survey 26. Similarly, maintenance changes at 154 and repair changes at 156 cause updating at 152.1 and 152.2 of the site survey 26 as well as client advisory indications at 158 and a library data base of installed equipment update at 160. The history of the particular site is then updated at 162 so that system 20 has up to date information as to any particular site for future work requirements.

With reference to FIGS. 2, 3, 5, 10 and 11 the configuration 122 of a rack 94 with equipment installed in accordance with the invention is shown. The process relies upon the availability of appropriate drawing information, such as CAD drawings at 122.7, see FIG. 3, and images generated at of the racks in data bases. The combination of CAD drawings and images enables system 20 to maintain inventory 122.8, FIG. 3, updating of the rack library as at 122.7 and an updating of rack installations information by granting network access to the data bases containing this information to the client. Work orders necessary from the rack configuration process can be implemented in the manner as described with reference to FIG. 2.

Figure 11:
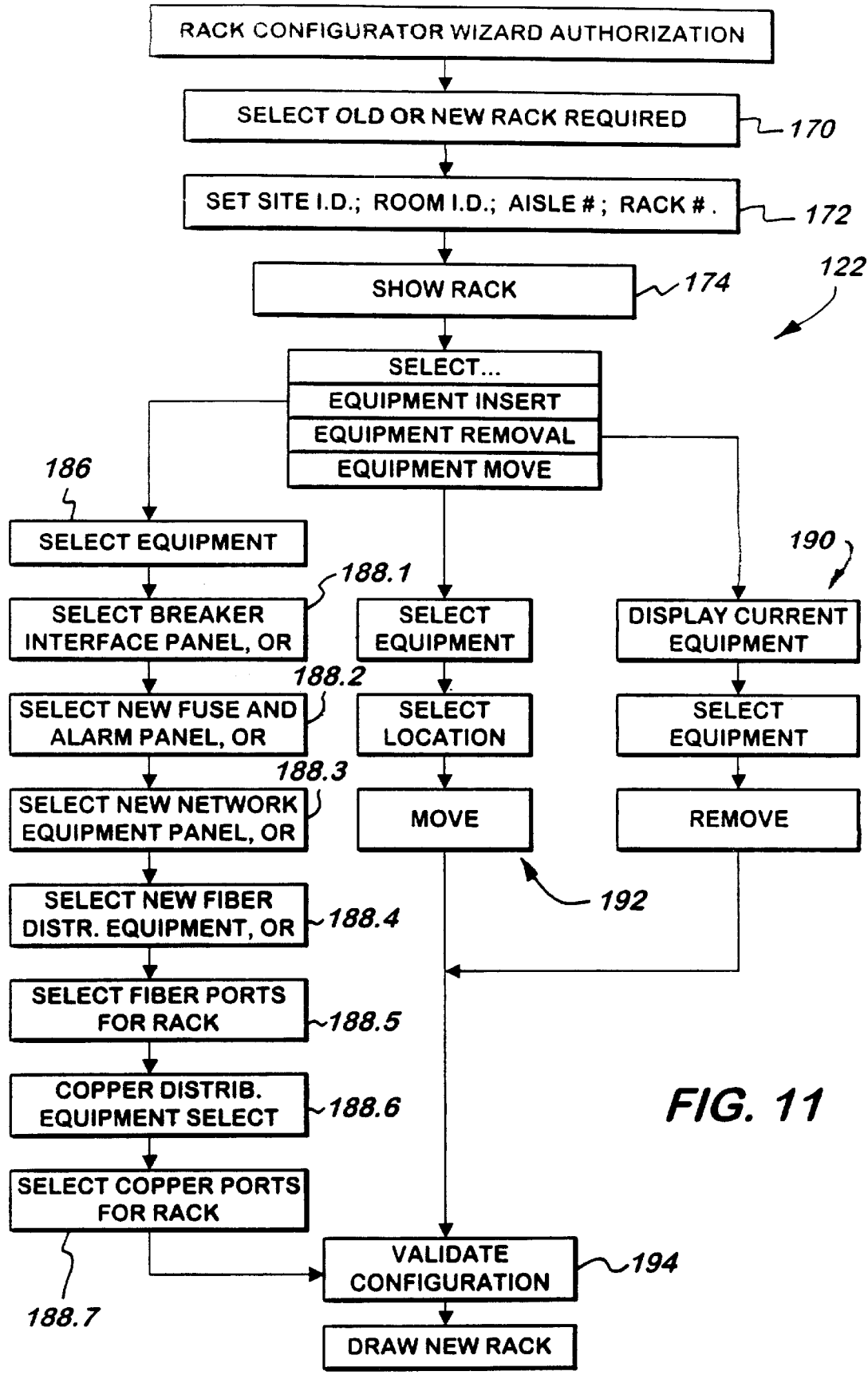
FIG. 11 is a more detailed flow diagram for a rack configuration process used in the telecommunication system of the invention.

FIG. 11 shows a rack configuration process 122 in greater detail. This process may involve a selection at 170 for a new rack 94 or a change to a previously installed and configured rack. The site, room, aisle and particular rack number are assigned at 172 and a cad drawing of the rack is displayed at 174. One display 175 may appear as shown in FIG. 13 where a listing 176 of different equipment 178.1–4 is illustrated. The list 176 is for equipment already installed on a rack 94.1, but list 176 could be for example a collection of different equipment to be chosen from for installation on a new rack 94. Rack 94.1 is partially shown, but can be fully displayed by using the scroll bar 180. Note that each rack has its installation positions identified by so-called U numbers 182, with each U dimension being of a particular amount as is well known in the field; preferably, however, the installation positions are identified with standard dimensions referenced to a particular location on the rack.

For either a new rack 94 or modification of an existing rack the telecom selection process involves the selection steps at 186 in FIG. 11 of telecom equipment 188. The process involves selecting a desired equipment in the list 176, dragging the selection to a location on the rack or clicking the rack location on the displayed rack 94.1 to insert the equipment. A similar process can be used to either remove equipment at 190 or at 192 move it to a new location on the rack.

Once a rack has been provided with telecom equipment, or during the rack insertion process, a validation process takes place at 194. The validation involves making sure that inserted telecom equipment does not exceed the power limitations, that the allocated space on the rack is suitable for the particular equipment, and that the impact of the telecom equipment on the cooling capabilities of the site is within acceptable limits. Other rules and requirements may apply such as making sure that the form factor applicable to a particular telecom equipment is not violated by the available space or designated installation area on the rack. In case of a valid rack design, the system 20 produces a CAD drawing of the rack as suggested at 94.1 in FIG. 13.

Figure 12:
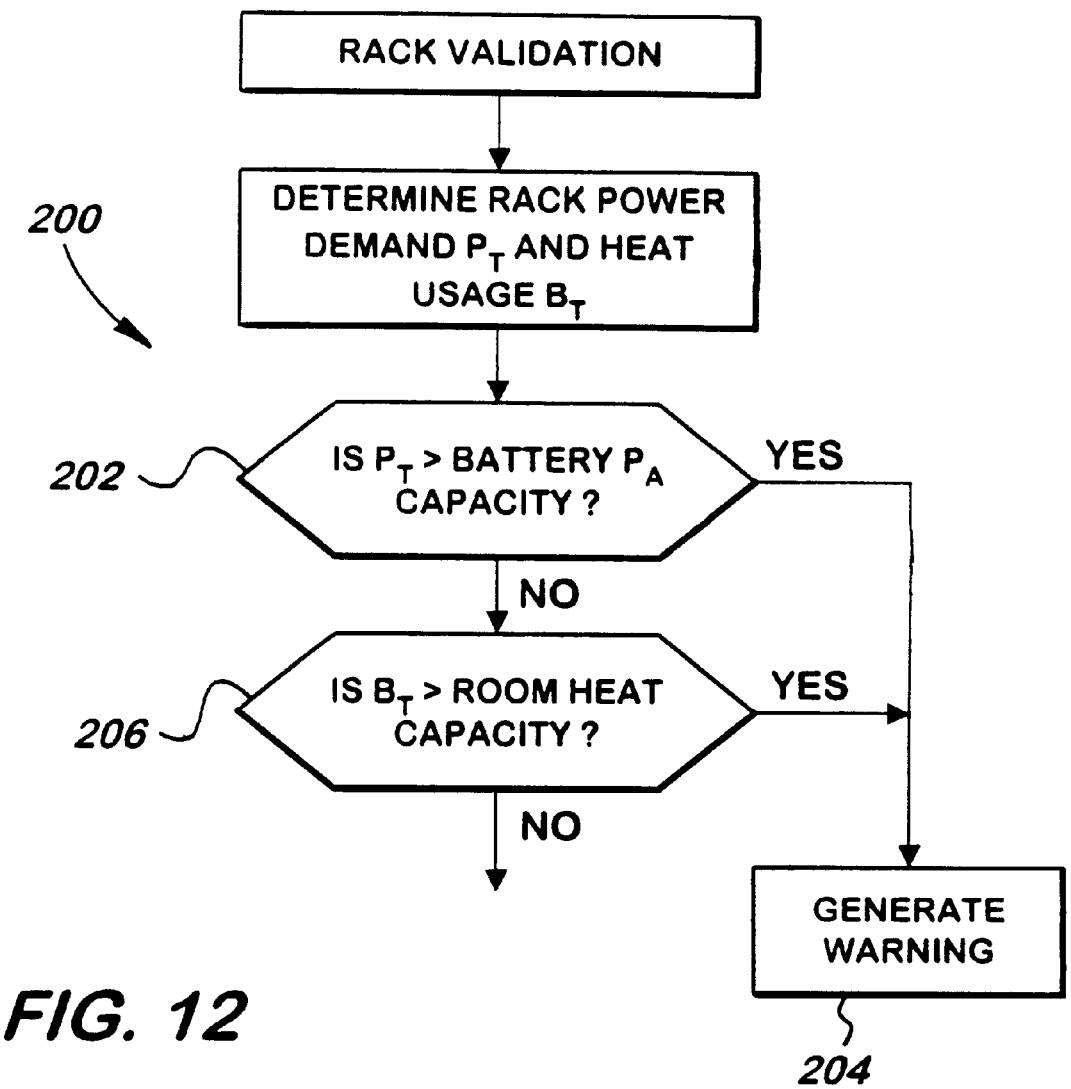
FIG. 12 is a flow diagram for a rack validation process in accordance with the telecommunication system of the invention.

Rack validation can be done using a process 200 as shown in FIG. 12 for several parameters. It is to be understood that the process 200 can be for a single parameter, or for a plurality with the validation being carried out during the design of a rack to determine when and if a particular design exceeds acceptable parameter values such as for power, cooling, dimensions and positional requirements. Thus as illustrated in FIG. 12 for power and cooling, at 202 the power $P_T$ demanded from the rack power supply by the telecom equipment 188 is compared with the available power $P_A$ from the battery capacity at the rack. The power for the telecom equipment for all racks at one particular site originates from batteries as illustrated in FIG. 5 and it is essential that the maximum power load does not exceed the battery capacity. Typically the load on battery power is limited to some maximum portion of battery power such as 80%, though other limits can be used.

If the test at 202 is positive then a warning, either visual or oral or both is generated at 204. Another test is made at 206 as to whether the site's cooling capacity is exceeded by the telecom equipment on the rack 94.1. If so a warning is generated at 204. Note that the sequence of validations are for illustration only and can be done on a continual basis.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for managing equipment at a site, said system comprising:
   a computer;
   a rules database accessible by said computer, said rules database having a plurality of rules stored thereon;
   a site information database accessible by said computer, said site information database having site information data stored thereon;
   an equipment specification database accessible by said computer, said equipment specification database having technical specification data for a plurality of equipment stored thereon;
   software executing on said computer for receiving a site identifier and a component selection submitted by a client; and
   software executing on said computer for retrieving technical specification data for the selected component from said equipment specification database, for retrieving site information data for the identified site from said site information database, and for analyzing the retrieved technical specification data and the retrieved site information data with respect to the rules stored on said rules database.

2. The system of claim 1 wherein the site information data includes site capacity data and an installed equipment listing.

3. The system of claim 1 further comprising software executing on said computer for retrieving a component listing from the component database, and forwarding the component listing to a client.

4. The system of claim 1 further comprising software executing on said computer for generating and transmitting to the client a rule violation notice if the analysis of the retrieved technical specification data and the retrieved site information data with respect to the rules stored on said rules database indicates that a rule has been violated.

5. The system of claim 1 wherein the analysis of the retrieved technical specification data and the retrieved site information data with respect to the rules stored on said rules database compares rack configuration and space with specifications for the selected component.

6. The system of claim 1 wherein the analysis of the retrieved technical specification data and the retrieved site information data with respect to the rules stored on said rules database compares cooling capacity with heat generated by the selected component.

7. The system of claim 1 wherein the analysis of the retrieved technical specification data and the retrieved site information data with respect to the rules stored on said rules database compares power capacity with power consumption for the selected component.

8. The system of claim 1 wherein the component selection is made by the client on a graphical representation of the site.

9. The system of claim 1 wherein the site information database includes a graphical representation of the site and wherein the component selection is made by modifying the graphical representation of the site.

10. A method for managing a telecommunications site comprising the steps of:
  providing a computer;
  storing engineering rules on a database accessible by the computer;
  storing site information including site capacity data and an installed equipment listing on a database accessible by the computer;
  storing components technical specification data on a database accessible by the computer;
  retrieving a component listing from the component database, and forwarding the component listing to a client;
  receiving a site identifier and a component selection submitted by the client; and
  retrieving technical specification data about the selected component, and analyzing the component selection and installed equipment with reference to the site capacity and with rules retrieved from the engineering database.

11. The method of claim 10 further comprising the step of forwarding a rule violation notice to the client.

12. The method of claim 10 wherein the engineering rules analysis step compares rack configuration and space with specifications for the component selection.

13. The method of claim 10 wherein the engineering rules analysis step compares cooling capacity with heat generated by the component selection.

14. The method of claim 10 wherein the engineering rules analysis step compares power capacity with power consumption for the component selection.

15. The method of claim 10 wherein the component selection is made by the client on a drawing of the site.

16. The method of claim 10 wherein the site information database includes a drawing of the site and wherein the component selection is made by modifying the drawing of the site.

17. A method for managing equipment at a site comprising the steps of:
  providing a computer;
  storing a plurality of rules on a rules database accessible by the computer;
  storing site information data on a site information database accessible by the computer;
  storing technical specification data for a plurality of equipment on an equipment specification database accessible by the computer;
  receiving a site identifier and a component selection submitted by a client; and
  retrieving technical specification data for the selected component from the equipment specification database, retrieving site information data for the identified site from the site information database, and analyzing the retrieved technical specification data and the retrieved site information data with respect to the rules stored on the rules database.

18. The method of claim 17 wherein the site information data includes site capacity data and an installed equipment listing.

19. The method of claim 17 further comprising the step of retrieving a component listing from the component database, and forwarding the component listing to a client.

20. The method of claim 17 further comprising the step of generating and transmitting to the client a rule violation notice if the analysis of the retrieved technical specification data and the retrieved site information data with respect to the rules stored on the rules database indicates that a rule has been violated.

21. The method of claim 17 wherein the analysis of the retrieved technical specification data and the retrieved site information data with respect to the rules stored on the rules database compares rack configuration and space with specifications for the selected component.

22. The method of claim 17 wherein the analysis of the retrieved technical specification data and the retrieved site information data with respect to the rules stored on the rules database compares cooling capacity with heat generated by the selected component.

23. The method of claim 17 wherein the analysis of the retrieved technical specification data and the retrieved site information data with respect to the rules stored on the rules database compares power capacity with power consumption for the selected component.

24. The method of claim 17 wherein the component selection is made by the client on a graphical representation of the site.

25. The method of claim 17 wherein the site information database includes a graphical representation of the site and wherein the component selection is made by modifying the graphical representation of the site.

26. A telecommunication site management system comprising
  a computer;
  software executing on said computer for automatically forwarding a survey request to a technician;
  site data collected by the technician from the telecommunication site, said site data input to said computer;
  a device accessible by said computer for storing data;
  a database of telecommunication component technical specification data accessible by said computer;
  a program executing on said computer for retrieving component technical specification data corresponding to said site data, said program automatically generating a schedule of tasks to be performed for maintenance of the telecommunication site based at least in part upon the retrieved technical specification component data, and storing said tasks on said data storage device.

27. The system of claim 26 wherein said survey request is prepared on said computer by a client.

28. The system of claim 26 wherein said computer is connected to the Internet.

29. The system of claim 28 wherein said survey request is forwarded to the technician by email.

30. The system of claim 26 wherein said site data is stored on said data storage device.

31. The system of claim 26 wherein said site data includes information selected from the group comprising client, location, spare part inventory, power capacity, cooling capacity, rack capacity, component list, rack configuration, and combinations of these.

32. The system of claim 26 wherein said computer generates a CAD drawing of the site for storage on the data storage device.

33. A telecommunication site management system comprising:
  a work request including a site identifier and task to be performed;
  a computer for receiving said work request;
  a database of site information accessible by said computer;

a database of technician capabilities accessible by said computer; and a program executing on said computer for retrieving site information corresponding to said work request to determine required technician capabilities, said program for identifying a technician based on the required capabilities for said work request, and for sending a work order to the identified technician.

34. The system of claim 33 wherein said work request is prepared on said computer by a client.

35. The system of claim 34 wherein said computer receives an as-built report prepared by the technician and forwards it to the client.

36. The system of claim 35 wherein said computer updates said site information database upon receipt from the client of an as-built approval.

37. The system of claim 33 including a database of maintenance tasks, and wherein said work request is prepared on said computer from said maintenance task database.

38. The system of claim 37 wherein said maintenance task database is updated upon completion of the work order.

39. The system of claim 33 wherein said computer is connected to the Internet.

40. The system of claim 33 wherein the work order includes a drawing of the site.

41. The system of claim 40 wherein the drawing of the site is updated upon completion of work and is stored on said site information database.

42. A telecommunication site management system comprising:

a computer;

a database of engineering rules accessible to said computer;

a database of site information including site capacity data and an installed equipment listing accessible to said computer;

a database of telecommunication components technical specification data accessible to said computer;

a program executing on said computer for retrieving a component listing from said component database, and for forwarding the component listing to a client; and a site identifier and a component selection submitted to said computer by the client;

said program retrieving technical specification data about the selected component, and analyzing the component selection and installed equipment with reference to the site capacity and with rules retrieved from said engineering database.

43. The system of claim 42 wherein said computer forwards a rule violation notice to the client.

44. The system of claim 42 wherein the engineering rules analysis compares rack configuration and space with specifications for said component selection.

45. The system of claim 42 wherein the engineering rules analysis compares cooling capacity with heat generated by said component selection.

46. The system of claim 42 wherein the engineering rules analysis compares power capacity with power consumption for said component selection.

47. The system of claim 42 wherein said component selection is made by the client on a drawing of the site.

48. The system of claim 42 wherein said site information database includes a drawing of the site and wherein said component selection is made by modifying the drawing of the site.

49. A method for managing, maintaining and monitoring telecommunications systems and telecom equipment distributed in a geographic region and located in telecom equipment rooms in buildings where telecom equipment of various types are connected to communication links formed of copper and/or optical fiber cables entering the building and leading to communication hard-ware at subscribers as part of a communication service provided by a telecommunication client, comprising the steps of:

storing data representative of telecom equipment performance and power requirements in a library data base;

storing data representative of environmental characteristics of remote telecom rooms in a data base;

storing data representative of physical dimensions of racks in which telecom equipment is mounted in a data base;

storing data representative of installed telecom equipment in racks in respective telecom rooms in a data base including data including available telecom equipment space on the racks;

storing data representative of the capacity of power sources available in respective racks and connected to installed telecom equipment in the racks, and storing data representative of the resulting electrical loads on the power sources in the racks in a data base;

determining from the data stored in the data base the electrical capacity remaining for respective power sources located in the racks;

generating a visible computer screen with data relevant for the addition of a telecom equipment for a particular rack;

deriving a new value for the electrical capacity remaining in the power source for the particular rack when said other telecom equipment data is added; and generating a visible computer screen indication representative of a validation of the addition of the telecom equipment to the particular rack on the basis of available electrical power in the rack; and following validation, installing the additional telecom equipment in a particular rack location which is determined to be available from information in the data base related to the particular rack.

50. The method as claimed in claim 49 and further including the steps of:

generating electronic images of racks with telecom equipment installations at respective telecom rooms and related to a particular client;

storing the electronic images in a data base in association with respective clients;

providing a client access through the web to stored images relevant to that client and transmitting images desired by the client along the web to the client to enable the client to make a visual verification of telecom equipment installed in a rack at a telecom room.

51. A method for managing, maintaining and monitoring a telecommunication system through the use of the web with the telecommunication system including telecom equipment distributed in a geographic region and located in telecom equipment rooms in buildings where telecom equipment of various types are connected to communication links formed of copper and/or optical fiber cables entering the building and leading to communication hardware at subscribers as part of a communication service provided by a telecommunication client, comprising the steps of:

storing in a data base, at a control station, data representative of telecom equipment installed in racks at various telecom rooms and of the racks so that data representative of available electrical power in respective racks and power consumed by the installed telecom equipment, the physical layout of telecom equipment in respective racks and available space on the racks are accessible through the web;

enabling a remotely located client to access the data base through the web and retrieve data related to installed telecom equipment and the racks in which the telecom equipment is installed;

entering, through the web, a desired change to the telecom equipment for a particular telecom equipment room into the data base;

deriving an evaluation within a signal processor having access to the data base whether the power requirements of telecom equipment for a rack in the particular telecom room after the desired change is implemented is feasible with respect to a total available power for the telecom equipment in the rack;

implementing the desired change to the telecom equipment;

forming an electronic image of the rack in which telecom equipment was changed;

storing the electronic image in the data base for viewing by the remotely located client.

52. The method as claimed in claim 51 and further including the steps of:

storing termination ports of individual communication lines entering into and exiting from telecom equipment relevant to a telecom equipment room into the data base;

entering the termination ports for telecommunication lines to be connected to the desired equipment into the data base; and comparing the termination ports for the respective telecommunication lines to validate the installation for the telecom equipment.

53. A method for communicating telecommunications information over an on-line service between a client and a technician at an on-site location, comprising:

providing an on-line service accessible by the client and by the technician;

providing an on-site image capturing device;

allowing the client information over the on-line service to specify a modification to be made to telecommunications equipment at the on-site location;

informing the client through the on-line service of the feasibility of the modification;

performing the modification to the equipment at the on-site location; and transmitting an on-site image of the modification to the on-line service such that the image is accessible by the client.

54. The method for communicating telecommunications information according to claim 53, wherein a modification comprises adding equipment or removing equipment.

55. The method for communicating telecommunications information according to claim 54, further comprising placing equipment manuals on the on-line service for the technicians to use at the on-site location.

56. The method for communicating telecommunications information according to claim 53, wherein informing the client through the on-line service of the feasibility of the modification comprises informing the client of a power input requirement of the equipment and of an available power output.

* * * * *